(12) United States Patent  
Turicchi, Jr.

(10) Patent No.: US 7,895,012 B2
(45) Date of Patent: Feb. 22, 2011

(54) SYSTEMS AND METHODS FOR ORGANIZING AND STORING DATA

(75) Inventor: Thomas E. Turicchi, Jr., Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1003 days.

(21) Appl. No.: 11/121,279

(22) Filed: May 3, 2005

(65) Prior Publication Data

US 2006/0265192 A1 Nov. 23, 2006

(51) Int. Cl.
*G06F 15/00* (2006.01)

(52) U.S. Cl. .................. 702/127; 702/182; 702/186; 702/187

(58) Field of Classification Search .......... 702/127, 702/182–186; 700/32, 33, 108, 174, 10; 719/315; 717/101, 104, 128; 711/112, 117; 707/999.102

See application file for complete search history.

(56) References Cited

U.S. PATENT DOCUMENTS

| | | | | | |
|---|---|---|---|---|---|
| 5,274,508 | A | * | 12/1993 | Tan et al. | 360/48 |
| 5,440,686 | A | * | 8/1995 | Dahman et al. | 345/537 |
| 5,603,331 | A | | 2/1997 | Heemels et al. | |
| 5,930,798 | A | * | 7/1999 | Lawler et al. | 707/102 |
| 6,505,249 | B1 | * | 1/2003 | Rehkopf | 709/224 |
| 6,741,965 | B1 | * | 5/2004 | Shimoyoshi et al. | 704/500 |
| 6,775,825 | B1 | * | 8/2004 | Grumann et al. | 717/127 |

FOREIGN PATENT DOCUMENTS

| | | |
|---|---|---|
| EP | 1 330 038 A1 | 12/1999 |
| EP | 1 115 089 A2 | 12/2000 |
| JP | 10275101 A | 10/1998 |
| JP | 11251923 | 9/1999 |
| JP | 2001-273172 A | 10/2001 |
| WO | WO-97/13164 A1 | 4/1997 |
| WO | WO-00/05599 A2 | 2/2000 |
| WO | WO-00/53082 A1 | 9/2000 |
| WO | WO 2006/003960 | 4/2006 |

OTHER PUBLICATIONS

Fundamental Concepts and techniques/Sampling and Quantizing; chapter 3, pp. 55-93, Nov. 18, 2003. http://ptgmedia.pearsoncmg.com/images/0134947908/samplechapter/0134947908_ch03.pdf.*

K, Shotatsu "Gazou Asshuku Arugorizumu (11) Jouhouryou Sakugen Ni Yoru Hikagyakuasshuku", *C Magazine, Softbank Publishing*, vol. 14, No. 5, May 1, 2002, pp. 120-125.

(Continued)

*Primary Examiner*—Drew A Dunn
*Assistant Examiner*—Hien X Vo

(57) ABSTRACT

One embodiment includes a method for tracking usage of system components such that for each system component to be tracked the value of that component is measured on a successive time unit basis and the measured value is stored together with the number of successive time units that value repeats. Another embodiment includes a system for handling data representative of system conditions in which rapidly changing data values are received from at least one of the monitored sources such that each data value is representative of system conditions with respect to a small period of time; and such that the data is compressed while preserving the data values for each of the small periods of time.

25 Claims, 5 Drawing Sheets

OTHER PUBLICATIONS

Oyama, Hiroo "Purosessa Gurupu No Douteki Bunkatsu Niyoru Heiretsusaiki Puroguramu No Jitsugenn Shuhou" *Transactions of IPSJ, Information Processing Society of Japan*, vol. 43,Jan. 15, 2002,pp. 107-117.

Kai, Hisaaki "Marutipuroguramingu Kankyo No Marutipurosessa Niokeru 2 Reberu Sukejuringu, Sukejuringu Kozou to Seinohyouka", *Transactions of IPSJ, Information Processing Society of Japan*, vol. 35, No. 10, Oct. 15, 1994, pp. 2115-2127.

"*Translation of Japanese Office Action for Application 2006-128323*," Jun. 9, 2009,3 pages.

* cited by examiner

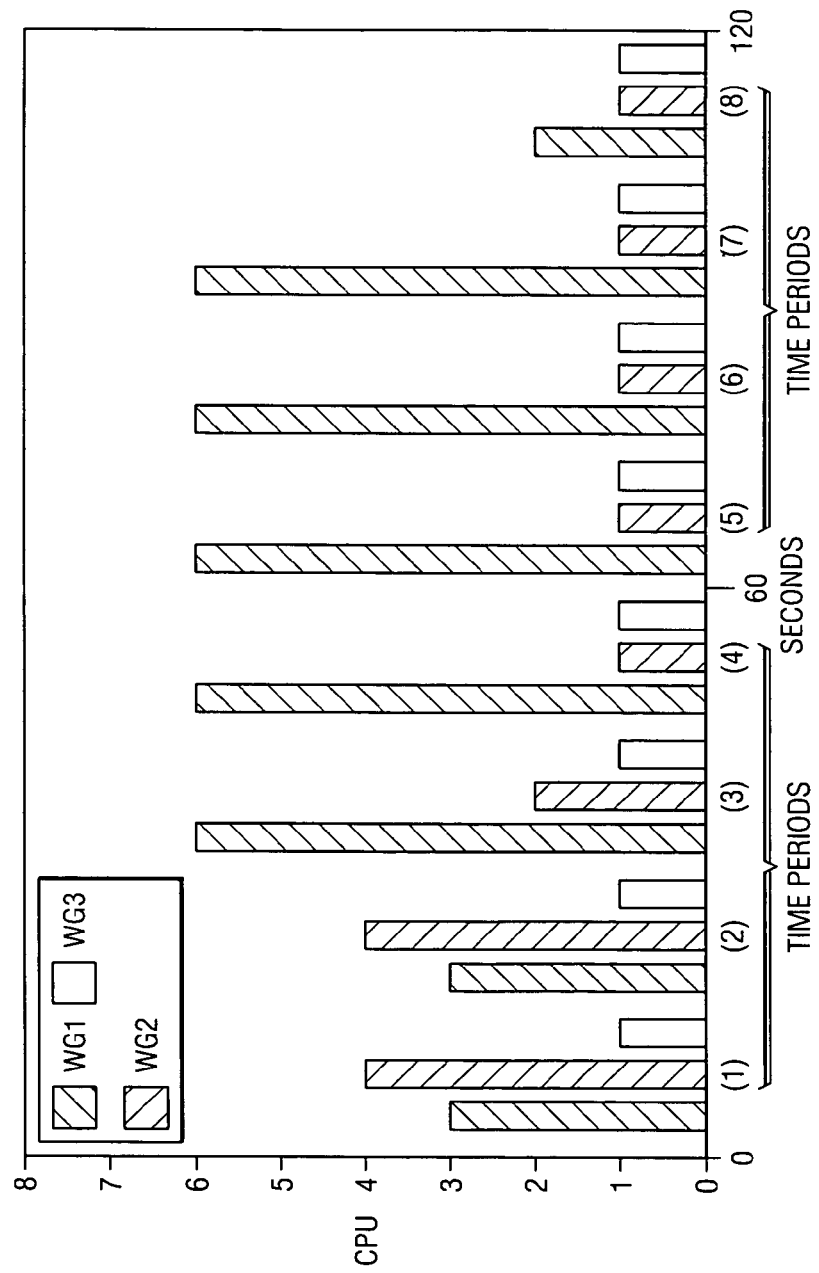

| TIME (HH:MM:SS) | CPU UTILIZATION | BIN |
| --- | --- | --- |
| 12:00:00 | 3.1% | 0 |
| 12:00:15 | 3.5% | 0 |
| 12:00:30 | 5.3% | 0 |
| 12:00:45 | 4.6% | 0 |
| 12:01:00 | 4.1% | 0 |
| 12:01:15 | 4.5% | 0 |
| 12:01:30 | 5.2% | 0 |
| 12:01:45 | 5.6% | 0 |
| 12:02:00 | 23.1% | 1 |
| 12:02:15 | 23.5% | 1 |
| 12:02:30 | 25.3% | 1 |
| 12:02:45 | 24.6% | 1 |
| 12:03:00 | 24.1% | 1 |
| 12:03:15 | 25.5% | 1 |
| 12:03:30 | 24.3% | 1 |
| 12:03:45 | 23.6% | 1 |
| 12:04:00 | 20.1% | 1 |
| 12:04:15 | 8.5% | 0 |
| 12:04:30 | 9.3% | 0 |
| 12:04:45 | 7.6% | 0 |
| ⋮ | ⋮ | ⋮ |

*FIG. 2A*

| CPU UTILIZATION (%) |
| --- |
| BEGIN 12:00:00 |
| 0, 8, |
| 1, 9, |
| 0, 3, |
| ⋮ |

*FIG. 2B*

| CPU UTILIZATION | | |
| --- | --- | --- |
| BIN | MINIMUM VALUE (%) | MAXIMUM VALUE (%) |
| 0 | 0 | 20 |
| 1 | 21 | 40 |
| 2 | 41 | 60 |
| 3 | 61 | 80 |
| 4 | 81 | 100 |

*FIG. 3*

SYSTEMS AND METHODS FOR ORGANIZING AND STORING DATA

TECHNICAL FIELD

This invention relates to storage of data and more particularly to systems and methods for organizing and storing data.

BACKGROUND OF THE INVENTION

There are a variety of methods available for managing data, particularly computer system performance data. These methods typically collect and store performance data, and produce a variety of reports based on that data. Such performance data tracks, for example, the amount of resources available on a system; the number of CPUs used at a particular time; the amount of physical memory available at a particular time, etc. In addition, such methods collect data on how such resources are utilized. For example, CPU utilization (the percent of time during the interval during which each CPU was busy and idle) is monitored as is the run queue length (average number of processes waiting in line to use the CPU), memory utilization (the percent of real memory in use), and the number of CPUs in a work group. The above lists just a few of the parameters that need to be monitored, stored, and analyzed.

When a computer system is being troubleshot (a real-time operation), or when a system is being viewed in real-time, data is typically collected every 5 to 15 seconds and displayed for the user. Data this precise is often needed to diagnose a performance problem. However, when archiving data for future use, it is not practical to store samples for every 15 second period for each collected data parameter, especially when the data is typically archived for 6 months or longer. Thus, in order to store the data in a reasonable amount of storage space, management systems typically use sampling techniques where the metric is measured once in the sampling interval and stored. The assumption being that the data being sampled does not change significantly during the sampling interval, and thus, the value at the time of the measurement is deemed to be representative of the entire sampling interval. For fast changing systems, such as computer systems, such a method is ineffective.

Another solution is to average the data. Thus, if the measurement system collects 20 samples during the interval, the values of those 20 samples are averaged when archiving, allowing the management system to store only one data point for the interval. Averaging does not work for interactive systems where users submit queries and wait for a response which is usually obtained in a matter of seconds. The demand on such workloads varies from one minute to the next. Thus, during a five minute interval, the computer system may be idle much of the time, and completely saturated for a small amount of time. Performance may be unacceptably slow during the brief periods of overload. This overload may not show up when averaged with long idle periods occurring in the same sampling interval. In this situation, a five minute average is not a good representation of actual system operation.

Another major drawback to averaging type systems stems from a more recent change in the nature of computing systems where vendors are introducing various forms of virtual partitions or virtual machines. These systems are dynamic, allowing the system to add or remove resources very quickly. Thus, in any system where performance data is stored for subsequent use it is important to be able to drill down to small increments of time to determine resource usage.

For example, assume a virtual machine that's idle for four minutes, and has only one CPU allocated to it during those four minutes. If that virtual machine becomes very busy for the final minute of a five minute measurement interval, and an additional five CPUs are added to handle the load, what should a management system report for the number of CPUs in the server during the five minute interval? The tool that uses sampling will report either a "1", or a "6". The system that stores the average value will report that the server had an average of 2 CPUs. None of these values are particularly useful for understanding system operation during that five minute interval.

SUMMARY OF THE INVENTION

In one embodiment there is disclosed a method for tracking usage of system components such that for each system component to be tracked the value of that component is measured on a successive time unit basis and the measured value is stored together with the number of successive time units that value repeats.

In another embodiment a system for handling data representative of system conditions is disclosed in which rapidly changing data values are received from at least one of the monitored sources such that each data value is representative of system conditions with respect to a small period of time; and such that the data is compressed while preserving the data values for each of the small periods of time.

BRIEF DESCRIPTION OF THE DRAWINGS

For a more complete understanding of the present invention, reference is now made to the following descriptions taken in conjunction with the accompanying drawing, in which:

FIG. 1A is a chart showing examples of work group usage over a two minute period;

FIG. 1B shows an example of one embodiment of data compression based on the chart of FIG. 1A;

FIG. 2A is a chart showing the uncompressed time-series data for a four minute period;

FIG. 2B is a chart showing one embodiment of compressed time-series data for the example of FIG. 2A, where the data has been quantized;

FIG. 3 is a chart showing one embodiment of bins for quantizing data;

DETAILED DESCRIPTION OF THE INVENTION

Figure 4A:
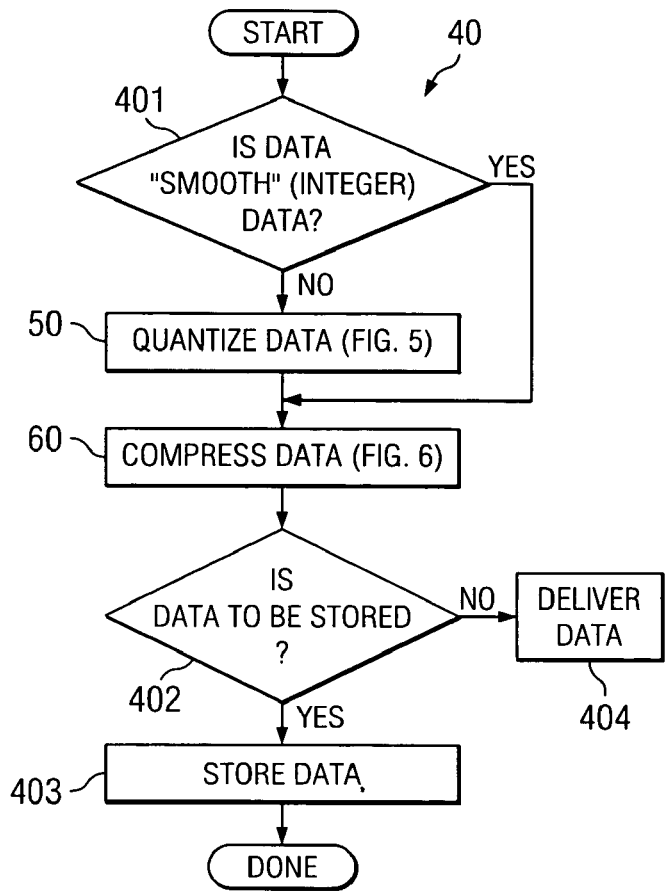
FIGS. 4A, 4B, 5, and 6 show embodiments of system and method operation.

In general, system parameters to be measured can be grouped into parameters measurable in discrete quantities and parameters that vary widely from instant to instant (non-discrete). CPU allocation is an example of a parameter that can be measured discretely because for any given period of time the number of CPU being allocated can be discretely counted. However, the usage (in % of total CPU capacity) could vary widely during any sampling interval and these usage measurements are examples of non-discrete parameters.

With respect to discretely measurable components the measurement interval can be variable and predetermined for any given section. For CPU allocation the time unit could be, for example, 15 seconds. This time unit matches the time unit used by some systems employing the CPU to reassign CPUs to other work groups. In such a system, a determination is made every 15 seconds as to how many CPUs are required for each work group. Thus, in a particular minute (and assuming 3 work groups and 8 CPUs), the first 15 seconds could be as shown in FIG. 1A where work group (WG) 1 has assigned to it 3 CPUs, WG 2 has 4 CPUs, and WG 3 has 1 CPU.

Continuing in FIG. 1A, the allocation of CPUs remains the same for the second 15 second period. Then in the third 15 second period WG 1 requires 6 CPUs, WG 2 uses 2, and WG 3 uses 1. For the remaining 15 second period (period 4) WGs 1 and 3 remain the same and WG 2 goes to 1. For the second minute (time periods 5-8) everything remains the same, except that in time period 8, WG 1 falls to 2 CPUs.

Using the concepts discussed herein, and as shown in FIG. 1B, the run length encoding for WG 1 is 3, 2; 6, 5; 2, 2. This translates to: 3 CPUs for 2 consecutive time periods; 6 CPUs for 5 consecutive time periods, and 2 CPUs for 2 consecutive time periods. For WG 2 it would be 4, 2; 1, 6 and for WG 3 it would be 1, 8.

In operation, the raw measurement data is maintained for long periods of time before run-length encoding occurs so as to allow for compacting the data for long term storage. Typically, the length of time the raw data is stored would be from two hours to two days before compression. Most commonly, the raw data would be stored for one day before compression.

FIG. 2A is a chart of uncompressed time-series data for data that must be quantized (non-discrete data) where starting at an arbitrary time of 12:00:00, CPU percent utilization is shown for 15 second intervals. Also shown for each CPU utilization value is a bin number, having within the bin the maximum utilization percentage shown. The bin number of FIG. 2A follows the bin example shown in FIG. 3.

The data parameters in FIG. 2A are quickly varying unlike the "smooth" or integer data discussed with respect to FIG. 1A. Thus, for an hour's worth of data, if each sample represents the value of the system performance metric for a 15 second interval, there would be 240 samples.

Accordingly, if quickly varying data (i.e., % of CPU usage in this example) were to be stored in the manner shown for the integer data of FIG. 1A, there would be no storage space savings. However, by establishing bins (for example 20% ranges) a CPU running at 15% capacity would be given a 1 and a CPU running at 3% would also be given a 1. The purpose of this step is to take "noisy" data and put it into large enough "bins" that minor variations in the individual values are smoothed. Using this arrangement, compression will not significantly change the values that are preserved. Thus, as shown in FIG. 2B, and using the bin values shown in FIG. 3, the run-length encoding would be 0, 8; 1, 9; 0, 3 for a time period beginning at 12:00 and running for four minutes, as shown in FIG. 2A.

Note that in any time period (15 second interval) the CPU's percentage of use can go up or down wildly, but the average of CPU usage during that period is a single value, namely the "bin" number as shown in FIG. 3. Various averaging rules could be established for certain percentages (i.e. the bin sizes can be non-uniform), since a CPU near 100% has consequences different than does a CPU hovering around, say 50%. However, since the time period is relatively short and can be adjusted as desired, this averaging does not affect subsequent usage of the stored data. The selection of bin sizes is important. The sizes of the bins should be large to compress the data well but small enough that important changes are not lost. Thus, for most CPU utilization, bin sizes would typically be between 10% and 20%.

FIG. 4A shows one embodiment 40 of a flow diagram for controlling the operation of the storage of data. Process 401 determines if the data is smooth data (integer data) that can be counted directly for each given time period. If the data is smooth data, then a process, such as process 60 (to be discussed with respect to FIG. 6), is followed to compress the data.

If the data is not smooth data, then process 50 (to be discussed with respect to FIG. 5) quantizes the data. Once such quantizing occurs, or if quantizing is not necessary, a process, such as process 60, is followed to compress the data.

Figure 4B:
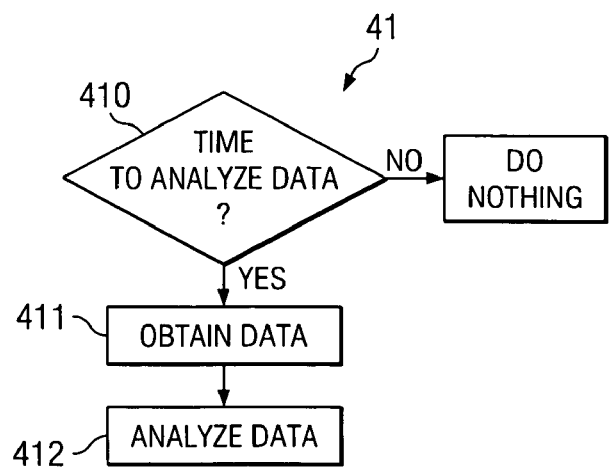

FIG. 4B illustrates one process 41 for analyzing the data. Process 410 determines if it is time to analyze the data. If it is, process 411 obtains the data and process 412 performs the analysis.

Figure 5:
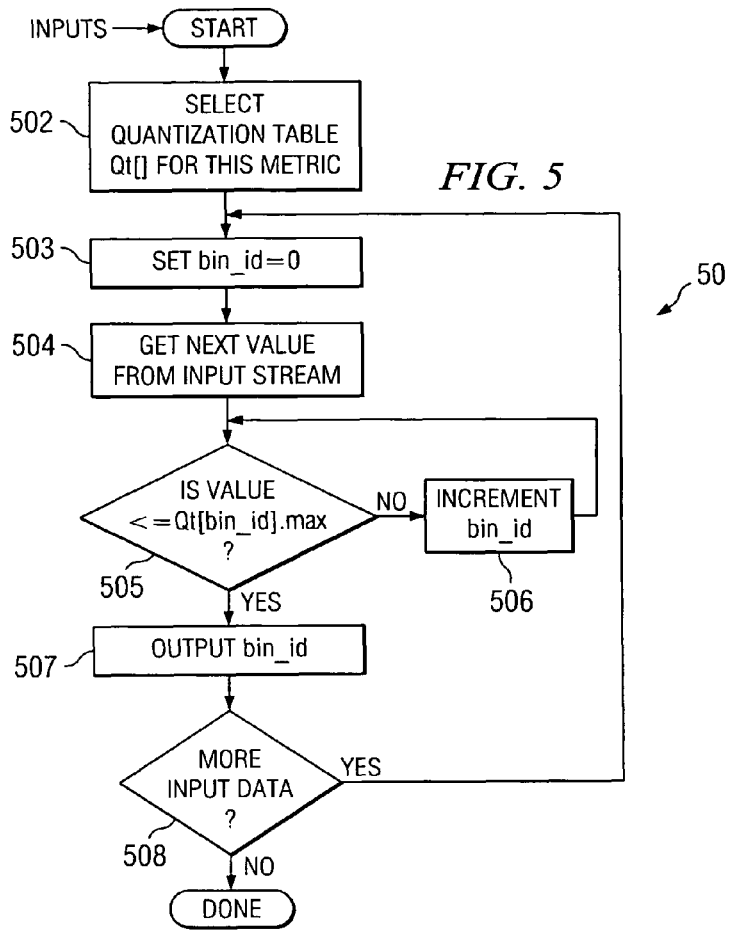

FIG. 5 shows one embodiment 50 of a process for quantizing data. The inputs would be metric names or another identifier and a series of values. These could be the values, for example, that are shown in FIG. 2A under the heading CPU capacity. Note that while CPU's are discussed herein, any data stream can be handled in the manner discussed so as to preserve the integrity of the data over periods of time without unduly mathematically changing the value of the data.

Process 502 selects the quantization table Qt [ ] (FIG. 3) for the given metric. This table sets the bin ranges. Process 503 sets the bin_id to zero. Process 504 obtains the next value from the data stream and process 505 determines if the new value is less than or equal to Qt[bin-id] maximum value. (FIG. 3 shows one example of bin maximum values.)

If the value is less than or equal to the bin-id max, then the bin-id identity is outputted (saved) by process 507 and more data is obtained by process 508. Processes 503-508 are continued until all data is given a bin-id.

When process 505 determines that a value greater than the current bin-id. maximum has arrived, then process 506 increments the bin-id and this new value is iterated with respect to process 505.

Figure 6:
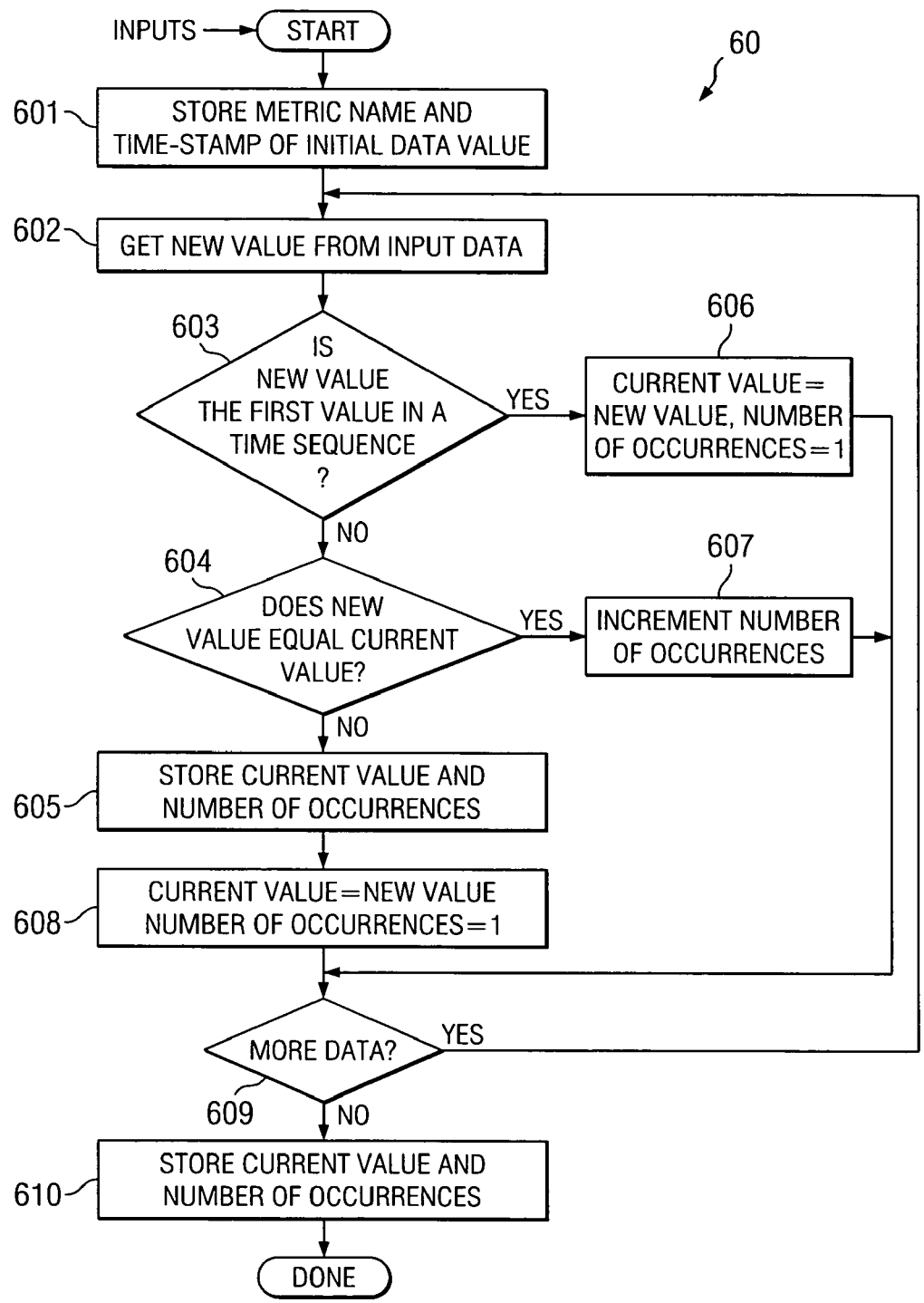

FIG. 6 shows one embodiment 60 of a process for compressing data in accordance with the concepts discussed herein. The inputs would be the metric name (or other identifier), a time stamp of when the metric was generated and a sequence of samples measured over time, each sample representing the value of a performance metric at each point in time. These performance metrics would be, for example, CPU percentage utilization, or number of CPU's in a work group, etc. The data values input to this routine can be either integer values or quantized values (process 50).

Process 601 stores the metric name and time stamp of an initial data value. Process 602 uses the input sequence to identify a NewValue and process 603 determines if the NewValue being presented is a FirstValue in a time sequence of values. If it is, then process 606 sets the CurrentValue to the NewValue and records a "1" for the NumberOfOccurrences. This means that this particular "new" value has appeared once.

Process 609 then obtains another NewValue working in conjunction with process 602. Process 603 then again determines if the NewValue is the beginning of a time sequence. This usually would not be determined from the actual data value but rather by a block of data corresponding to a period of time to be compressed.

If, in process 603, the NewValue is not a FirstValue then process 604 determines if the NewValue equals the CurrentValue. If it does then the NewValue must be a repeat of the CurrentValue and process 607 increments the NumberOfOccurrences. Processes 609, 602, 603, 604, and 607 then repeat continuously until such time as process 604 determines that a NewValue is different from the CurentValue. When that occurs process 605 stores the CurrentValue together with the NumberOfOccurrences of that value.

Process 608 then resets the CurrentValue to be the NewValue and again processes 609, 602, 603, 604 and 605 repeat until such time as process 609 stops asking for more data. This is occasioned by the input stream ending from the current block of data.

When process 609 determines that no more data is to be gathered for this sequence then process 610 stores the CurrentValue of the data along with the NumberOfOccurrences. Process 60 then takes the input data and stores it as a run length encoded string in the form discussed with respect to FIGS. 1A, 1B, 2A and 2B.

Figure 7:
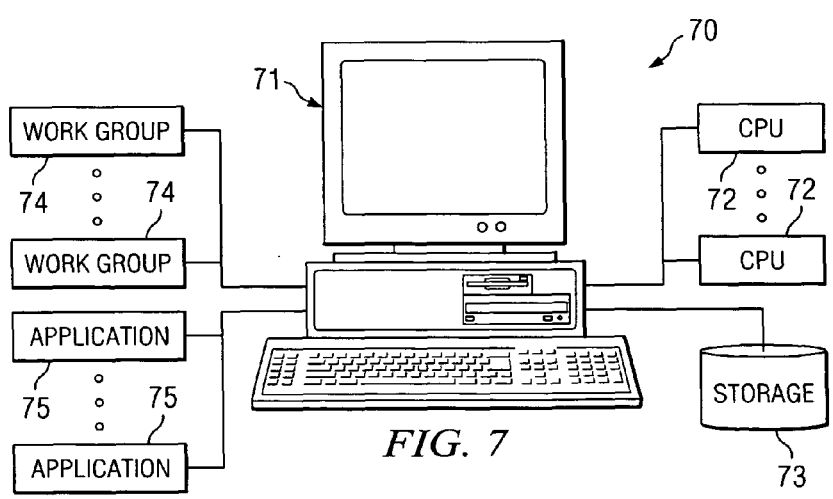
FIG. 7 shows one embodiment of system utilizing the concepts discusses herein.

FIG. 7 shows one embodiment 70 of a system in which computer 71 is shown with multiple CPU's 72, storage 73, multiple applications 75, and multiple work groups 74. One of the applications, for example, can control processes 40, 50 and 60 to gather, store (for example, in storage 73), and analyze the data being gathered. This will allow a user to observe, over a past interval, data at a finer granularity than could be possible using simple data averaging. Statistical analysis, controlled locally by an application or remotely by data transfer or otherwise, can then be achieved for capacity planning or for other purposes.

An important measurement in computer system analysis is determining how long a metric exceeded a threshold value. For example, how long was CPU utilization greater than 90%. This can be determined much more efficiently when the data is compressed using the concepts discussed herein. The bin-id that represents values larger than the threshold value is selected from the table. Then the compressed data is scanned for data pairs (a data pair is bin-id and number of occurrences) whose bin id matches that of the threshold. The time that the value was above the threshold is computed by taking the number of occurrences and multiplying by the interval. The data need not be uncompressed to make this calculation thereby making this arrangement much more efficient than other compression mechanisms.

Another important measurement in computer systems analysis is determining how often a metric exceeded a threshold value for longer than a selected duration. For example, "how often did CPU utilization exceed 90% for longer than five minutes?".

The analysis described above illustrates how to locate periods where the metric was above a threshold value and to determine how long it was above that value. Given a set of such data, it is straight forward to count the number of such occurrences which exceeded a time duration.

Another important tool in analyzing computer system performance is generating a histogram for a selected metric. For example, for the last six months, generate a histogram that shows what percent of time a computer system's CPU utilization was between zero and ten percent; what percent of the time it was between ten and twenty percent, and so forth.

Given data that is compressed according to the concepts discussed, a histogram can be generated by taking each data pair (bin-id and number of occurrences), and adding the number of occurrences into the appropriate bin in the histogram. This analysis can be performed without uncompressing the data. Also, in the special case of a histogram, consisting of only 2 bins the question can be answered as to what percent of the time the CPU utilization was greater than 90%. This can be computed in the manner discussed above.

What is claimed is:

1. A system for handling data representative of system conditions, said system comprising:

means for receiving rapidly changing data values from at least one source being monitored; each said data value representative of system conditions with respect to a small period of time;

means for run-length encoding said data values, by assigning bin-ids to said data values where a particular data value falls within a range associated with a bin-id assigned to said particular data value, so as to preserve said data values for each said small period of time; and means for storing said data values.

2. The system of claim 1 wherein said small period of time is under one minute.

3. The system of claim 1 wherein said small period of time is under 20 seconds.

4. The system of claim 1 wherein said compressing means comprises:

means for quantizing certain of said data prior to said compression.

5. The system of claim 1 wherein the means for storing comprises:

means for converting said data into a format wherein a value representative of the value of said data is presented together with a particular value representing the number of consecutive times that particular value appears in received ones of said data.

6. The system of claim 5 further comprising:

means for analyzing said presented data.

7. A computer system having a number of components each having parameters to be monitored, said system comprising:

storage for receiving a string of values representative of measured parameters with respect to certain of said components;

a process for converting received ones of said string of values into a run length string; and wherein certain of said component parameters are measurable directly as integer quantities and others of said component parameters must be quantized into integer parameters, said computer system further comprising:

a process for quantizing said others of said parameters prior to said converting.

8. The system of claim 7 wherein the number of CPUs allocated to a workgroup for a period of time is represented as an integer number, or as a fractional or floating point number to be quantized.

9. The system of claim 8 wherein the number of CPUs requested by or on behalf of a workgroup for a period of time is represented as an integer number, or as a fractional or floating point number to be quantized.

10. The system of claim 8 wherein the CPU utilization of a workgroup for a period of time is represented as an integer number, or as a fractional or floating point number to be quantized.

11. The system of claim 7 wherein the run queue length of the system or of a workgroup for a period of time is represented as an integer number, or as a fractional or floating point number to be quantized.

12. The system of claim 7 wherein said period of time is variable.

13. The system of claim 7 wherein said quantizing comprises:

assigning each measurement a value, said values corresponding to ranges, each said range having a lower limit and an upper limit.

14. The system of claim 13 wherein said period of time is 15 seconds.

15. The system of claim 13 wherein said ranges are selected from the list of: 10%, 15%, 20%.

16. A method for handling data values, said method comprising:

receiving, performed by a computer system, rapidly changing data values from at least one computer resource, each said data value representative of a parameter of said resource with respect to a small period of time;

separating, performed by said computer system, said data values into data values that can be compressed directly and data values that must first be quantized;

quantizing, performed by said computer system, said data values that must be quantized; said quantized data values yielding data values that can be compressed directly; and storing, performed by said computer system, said data values.

17. The method of claim 16 wherein said storing comprises:

compressing said data values that can be compressed while preserving said data values for each said small period of time.

18. The method of claim 17 wherein said small period of time is under one minute.

19. The method of claim 17 wherein said small period of time is under 20 seconds.

20. The method of claim 17 wherein said compressing comprises run length encoding said data values.

21. The method of claim 17 further comprising:

converting said data values into a format wherein a value representative of the value of said data is presented together with a particular value representing the number of consecutive times that particular value appears in received ones of said data.

22. The method of claim 17 further comprising:

calculating how long a metric exceeded a threshold value.

23. A computer non-transitory readable storage medium having instructions embodied therein that when executed cause a computer system to perform a method comprising:

code for controlling the receipt of rapidly changing data values from at least one computer resource, each said data value representative of a parameter of said resource with respect to a small period of time;

code for controlling the separation of said data values into data values that can be compressed directly and data values that must first be quantized; and code for controlling the quantizing of said data values that must be quantized; said quantized data values yielding data values that can be compressed directly.

24. The computer non-transitory readable storage medium of claim 23 further comprising:

code for controlling the compression of said data values that can be compressed while preserving said data values for each said small period of time.

25. The computer non-transitory readable storage medium of claim 24 further comprising:

code for controlling the conversion of said data values into a format wherein a value representative of the value of said data is presented together with a particular value representing the number of consecutive times that particular value appears in received ones of said data.

* * * * *